Feb. 22, 1949.  A. J. BENT  2,462,596
PACKING
Filed March 30, 1945
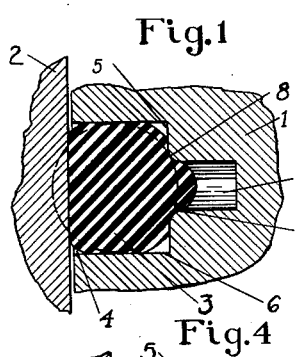
Fig. 1
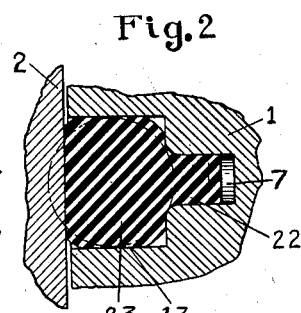
Fig. 2
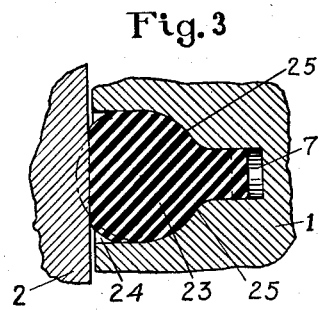
Fig. 3
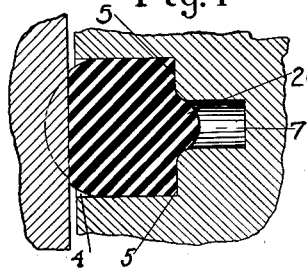
Fig. 4
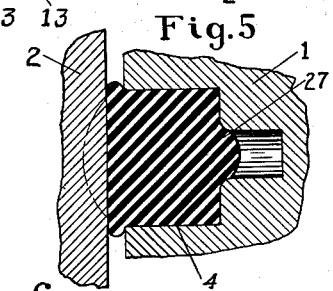
Fig. 5
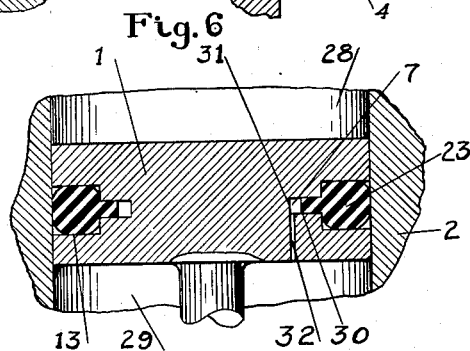
Fig. 6
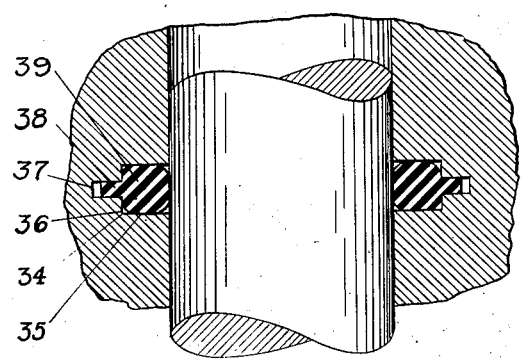
Fig. 7
*INVENTOR*
ARTHUR J. BENT
BY 
*ATTORNEY*

Patented Feb. 22, 1949

2,462,596

UNITED STATES PATENT OFFICE 2,462,596

PACKING

Arthur J. Bent, Wilkinsburg, Pa., assignor to The Westinghouse Air Brake Company, Wilmerding, Pa., a corporation of Pennsylvania Application March 30, 1945, Serial No. 585,638

1 Claim. (Cl. 309—23)

This invention relates to a novel sealing construction for use between a pair of cooperating elements which may be movable relative to each other, such as a piston and a cylinder, a valve stem in a guide, or a shaft journaled in a casing.

In the use of a packing of the usual cup type on a piston in a cylinder, the friction between the packing and the wall of the cylinder increases as the pressure of the fluid being confined increases. Heretofore this friction has not been of such a high degree as to be objectionable. But, with the increased use of fluid at high pressures for the control of airplanes, tanks, ships, and the like, the resulting friction has become high enough to be objectionable.

It is an object of this invention, therefore, to provide a novel packing structure for use between two elements movable relative to each other, which packing structure will function under the influence of any degree of fluid pressure to prevent excessive friction between the elements and at the same time maintain a tight seal between the elements.

A still further object is to provide a packing structure between two elements movable relative to each other, which structure comprises a resilient sealing ring for use in a groove of one of the aforementioned elements to establish an effective seal at all fluid pressures, at least one wall of the groove having formed therein a recess or depression into which the material of the sealing ring may flow or be displaced when the ring is compressed into the groove for operation.

Another object is to provide a packing for use between two cooperating elements which is of such simplified construction that the cost of manufacture is materially reduced.

These and other objects of the invention, that will be made apparent throughout the further description thereof, are attained by means of the packing and receptacle therefor hereinafter described and illustrated in the accompanying drawing, wherein:

Figure 1 is a fragmental sectional view of a pair of cooperating elements embodying features of the invention, and Figures 2, 3, 4 and 5 are similar views of modified forms of the invention.

Figure 6 is a fragmental sectional view showing how the piston is mounted in a cylinder and specially arranged to practice the invention; and Figure 7 illustrates the manner in which the invention may be utilized in a journal for a sliding or rotating rod or shaft.

Referring now to Fig. 1, there is shown a portion of a piston 1 arranged transversely to a wall 2 of a cylinder for reciprocating movement, the piston being spaced away from the wall a sufficient distance to provide the normal operating clearance. For carrying a packing ring 3 on the piston, the periphery of the piston is provided with an annular groove 4, which groove has a rectangular cross section with a depth slightly less than its width.

The packing ring 3 may be formed of any suitable material which is resilient and deformable such as rubber. As shown in dotted lines in Fig. 1, the packing ring is substantially circular in cross section and, for reasons which will now appear, it is preferred that the sectional diameter be greater than the depth of the groove 4 plus the piston clearance and slightly less than the width of the groove.

As will be apparent from an examination of Fig. 1, when the piston is mounted in the cylinder, the packing ring 3 will be squeezed or pressed between the wall 2 of the cylinder and the bottom or inner surface 5 of the groove, and in response to this pressure the packing ring will flow or be displaced laterally of the groove 4 into sealing engagement with side walls 6 of the groove. Further flow or displacement of the packing ring thereafter resulting from additional pressure will be received in an annular recess 7 formed in the bottom or inner surface 5 of the groove 4. This annular recess 7 is substantially rectangular in cross section, the corners 8 being preferably rounded to avoid cutting the packing ring when it is pressed.

It should be noted that air will be sealed or locked in the annular recess 7 and in the groove 4 beneath the packing 3, or to the right of the packing as viewed in the drawing. The air, however, being a compressible medium will be more yieldable than the packing and will permit a limited further displacement of the packing ring in response to a squeeze or pressure on the lefthand side of the packing ring as viewed in the drawing.

Now when the piston 1 is subjeced to the pressure of fluid, the fluid pressure may flow by way of the clearance space between the piston 1 and the cylinder wall 2 to a portion of the packing ring 3 and exert a force thereon radially inward of the piston, or to the right as viewed in the drawing. Thus it will readily be seen that any fluid pressure which is communicated to the periphery of the piston will act on the packing ring only in a direction to cause the material of the ring to flow into the recess 7 and any unfilled space in the groove 4, thus insuring against excessive pressure of the packing ring against the cylinder wall.

It will also be understood that it is desired that the packing ring 3 be permitted to slide only along the cylinder wall 2, and will not be permitted to rotate in the groove 4 or to roll along the cylinder wall, for the reason that this action would tend to turn the ring inside out, or otherwise distort it so as to increase the pressure that the packing exerts upon the cylinder wall. It is also in the furtherance of this end that the shapes of the packing 3, groove 4 and the recess 7 shown and described are desired, together with the relative proportions shown and described therewith. The flat surface which engages the cylinder wall, having its edges rounded, and the packing ring being distorted against the side walls of the groove, and into the annular recess, all serve to prevent the packing ring from rolling along the cylinder wall.

The modifications now to be described and shown in Figs. 2, 3, 4 and 5 are basically the same as that in Fig. 1 with more attention directed toward the prevention of the above-mentioned rolling of the packing ring on the cylinder wall.

The modification shown in Fig. 2 includes a packing member 13 comprising an annular lug 22 integrally formed with the inner periphery of a packing ring 23 which is otherwise the same as the packing ring 3 of Fig. 1. As shown, the lug 22 extends further into the annular recess 7 than does the ring 3 of Fig. 1 and consequently provides greater security against rolling of the ring 23.

The embodiment shown in Fig. 3 employs the packing ring 13 in an annular groove 24 having its bottom wall 25 formed to conform with the corresponding outline of the packing ring member 13 when not under pressure. Since the possible flow of the packing ring in the groove 24 is thereby reduced, it will follow that under the same conditions described in connection with Fig. 1 the packing ring 23 will be displaced further into the annular recess 7 which has been deepened for this purpose. The increased displacement into the annular recess will naturally increase the security against the rolling action of the packing ring.

The modification shown in Fig. 4 employs the annular groove 4 and annular recess 7 shown in Figure 1, but the inner periphery of a packing ring 26 differs from that shown in Fig. 1 in that it is shaped to conform to the bottom wall 5 of the groove 4. The fact that the packing ring 26 fits snugly into a rectangular groove will also increase the security against the rolling of the packing. Also, with the displacement in the groove in response to pressure being greatly reduced over that in Fig. 1, the same result described in connection with Fig. 3 will be attained.

The modification shown in Fig. 5 is similar to that shown in Fig. 4 except that the clearance space between the piston 1 and the cylinder wall 2 is greater. Also, the free height of the packing ring 27 has been increased to such a degree that when the piston is mounted in the cylinder, the packing ring 27 will be extruded into said clearance space beyond the width of the groove 4. This feature gives added security against the rolling action of this packing ring 27 over the form shown in Fig. 4.

The form of the invention shown in Fig. 6 is similar to that shown in Fig. 2 with the addition of means for maintaining the space in the recess 7 back or beneath the packing ring 23 at substantially atmospheric pressure. A pressure chamber 28 is located at the upper side of the piston 1 while a non-pressure chamber 29 is located at the lower side of the piston. Extending longitudinally of the piston from a number of points disposed preferably evenly in a wall 30 of the recess 7 and adjacent the inner end wall 31 are a plurality of passages 32 which connect the recess 7 to the non-pressure chamber 29. Thus, the frictional pressure exerted by the packing ring will be reduced by an amount equal to the pressure of fluid which might have been trapped in recess 7 acting over the area of the outer opening of the recess. Furthermore, with the fluid pressure in the recess 7 reduced to atmosphere and the fluid pressure acting on the outer surface of the packing ring 23 in the same manner as under previously described conditions, the lug 22 will be displaced further into the recess, thereby obtaining security against rolling of the packing ring.

The form shown in Fig. 7 of the drawings demonstrates the manner in which a packing having the features of that shown in Fig. 2 may be adapted to have an inwardly facing seal for engagement with a reciprocating or rotating shaft or stem. A stationary journal or guide 33 is provided at its inner periphery with an annular groove 34 in which is contained an annular packing member 35, the annular groove 34 having in its radially outermost surface 36 an annular recess 37 for receiving an annular lug portion 38 formed integrally with the outer periphery of a ring portion 39 of the member 35. The displacement of the lug portion 38 in the recess 37 in response to pressure exerted on the inner periphery of the ring portion 39 is the same as that described in connection with Figs. 1 and 2 and it is thought, therefore, that further detailed description of the form shown in Fig. 7 would add nothing to a complete understanding of the invention.

Having now described my invention, what I claim as new and desire to secure by Letters Patent, is:

The combination in a packing structure of a pair of cooperating members having opposite coaxial cylindrical faces, one of said members having formed therein an annular packing groove open to its cylindrical face and an annular recess open to said groove, a yieldable packing element of normal circular cross section disposed in said groove and engaging the face of the other member and comprising an annular portion disposed within said recess, and a conduit connecting to atmosphere the bottom of said recess.

ARTHUR J. BENT.

REFERENCES CITED

The following references are of record in the file of this patent:

UNITED STATES PATENTS

| Number | Name | Date |
| --- | --- | --- |
| 938,095 | Vlack | Oct. 26, 1909 |
| 1,278,713 | Moore et al. | Sept. 10, 1918 |
| 1,481,160 | Switzer | Jan. 15, 1924 |
| 2,208,620 | Baisch | July 23, 1940 |
| 2,247,609 | Devilbiss | July 1, 1941 |

FOREIGN PATENTS

| Number | Country | Date |
| --- | --- | --- |
| 710,360 | France | 1931 |
| 844,623 | France | 1939 |